United States Patent
Miyazaki et al.

(10) Patent No.: US 12,051,826 B2
(45) Date of Patent: Jul. 30, 2024

(54) NONAQUEOUS ELECTROLYTE SECONDARY BATTERY AND BATTERY PACK

(71) Applicant: Prime Planet Energy & Solutions, Inc., Tokyo (JP)

(72) Inventors: Atsushi Miyazaki, Himeji (JP); Tetsuya Okado, Hyogo (JP); Masashi Muraoka, Kakogawa (JP); Kazutaka Mita, Kobe (JP); Shuji Ogawa, Fukutsu (JP); Takafumi Tsukagoshi, Kasai (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 1 day.

(21) Appl. No.: 17/465,852

(22) Filed: Sep. 3, 2021

(65) Prior Publication Data

US 2022/0077545 A1 Mar. 10, 2022

(30) Foreign Application Priority Data

Sep. 8, 2020 (JP) ................................. 2020-150714

(51) Int. Cl.
*H01M 50/46* (2021.01)
*H01M 10/0587* (2010.01)

(52) U.S. Cl.
CPC ....... *H01M 50/46* (2021.01); *H01M 10/0587* (2013.01)

(58) Field of Classification Search
CPC .......................... H01M 50/46; H01M 10/0587
USPC ............................................................ 429/94
See application file for complete search history.

(56) References Cited

U.S. PATENT DOCUMENTS

| | | | |
|---|---|---|---|
| 2004/0137331 A1 | 7/2004 | Han et al. | |
| 2014/0201982 A1* | 7/2014 | Waseda | H01M 10/0587 29/623.1 |
| 2018/0277880 A1* | 9/2018 | Hosokawa | H01M 50/209 |
| 2018/0342720 A1* | 11/2018 | Kurakane | H01M 4/131 |
| 2019/0221796 A1 | 7/2019 | Kamo | |

(Continued)

FOREIGN PATENT DOCUMENTS

| | | |
|---|---|---|
| CN | 1512608 A | 7/2004 |
| CN | 103748732 A | 4/2014 |

(Continued)

*Primary Examiner* — Jonathan G Jelsma
*Assistant Examiner* — Omar M Kekia
(74) *Attorney, Agent, or Firm* — HAUPTMAN HAM, LLP

(57) ABSTRACT

A nonaqueous electrolyte secondary battery includes an exterior package, an electrode assembly, and an electrolyte solution. The exterior package stores the electrode assembly and the electrolyte solution. The electrode assembly is shaped to have a flat shape. The electrode assembly includes a layered body. The layered body includes a first separator, a positive electrode plate, a second separator, and a negative electrode plate. The first separator, the positive electrode plate, the second separator, and the negative electrode plate are layered in this order. The electrode assembly is formed by spirally winding the layered body. Each of the first separator and the second separator has a proportional limit of less than or equal to 10.2 MPa. The proportional limit is measured in a compression test in a thickness direction of each of the first separator and the second separator.

2 Claims, 10 Drawing Sheets

(56) References Cited

U.S. PATENT DOCUMENTS

| | | | |
|---|---|---|---|
| 2019/0221833 A1* | 7/2019 | Shimokawa | H01G 11/46 |
| 2019/0229317 A1 | 7/2019 | Sugioka et al. | |
| 2020/0106072 A1 | 4/2020 | Yogo et al. | |
| 2020/0335820 A1* | 10/2020 | Azuma | H01M 50/46 |

FOREIGN PATENT DOCUMENTS

| | | | |
|---|---|---|---|
| CN | 105466777 A | 4/2016 | |
| CN | 108847466 A | 11/2018 | |
| CN | 108933220 A | 12/2018 | |
| CN | 109690823 A | 4/2019 | |
| CN | 110970669 A | 4/2020 | |
| JP | 2002167558 A | 6/2002 | |
| JP | 2004214190 A | 7/2004 | |
| JP | 2004349201 A | 12/2004 | |
| JP | 201092833 A | 4/2010 | |
| JP | 2012-038655 A | 2/2012 | |
| JP | 2014506714 A | 3/2014 | |
| JP | 2014-137985 A | 7/2014 | |
| JP | 2014139865 A | 7/2014 | |
| JP | 201553237 A | 3/2015 | |
| JP | 2017-004923 A | 1/2017 | |
| JP | 2019125443 A | 7/2019 | |
| JP | 2019160587 A | 9/2019 | |
| WO | 2012099582 A1 | 7/2012 | |
| WO | 2018186135 A1 | 10/2018 | |

* cited by examiner

NONAQUEOUS ELECTROLYTE SECONDARY BATTERY AND BATTERY PACK

This nonprovisional application is based on Japanese Patent Application No. 2020-150714 filed on Sep. 8, 2020, with the Japan Patent Office, the entire contents of which are hereby incorporated by reference.

BACKGROUND OF THE INVENTION

Field of the Invention

The present disclosure relates to a nonaqueous electrolyte secondary battery and a battery pack.

Description of the Background Art

Japanese Patent Laying-Open No. 2004-214190 discloses a separator for a lithium battery, the separator having an elastic modulus of less than or equal to 2.0 kgf/mm².

SUMMARY OF THE INVENTION

A nonaqueous electrolyte secondary battery (hereinafter, simply referred as "battery") includes an electrode assembly. The electrode assembly is stored in an exterior package. Normally, the electrode assembly includes a positive electrode plate, a separator, and a negative electrode plate. The electrode assembly may be of winding type. The winding type electrode assembly is formed by spirally winding electrode plates and a separator, each of which is in the form of a strip. Two separators may be used. After the winding, the electrode assembly may be shaped to have a flat shape.

After the shaping, the electrode assembly may be loosened due to occurrence of springback in the electrode assembly. Hereinafter, this phenomenon is also referred to as "shape loosening". When such shape loosening occurs, reaction force of the battery becomes large. Here, the term "reaction force" indicates a counteracting force against acting force applied from a restraint component to the battery.

The battery is supposed to be expanded during charging. For example, in a battery pack, a housing is provided at an outer edge of the battery pack such that the outer dimensions of cells fall within a predetermined range. The housing includes a restraint component. The restraint component restrains a cell or a battery module. The restraint component includes, for example, an end plate and a band. When the reaction force of the battery is large, the restraint component is required to have high strength. That is, a degree of freedom in designing the battery pack is decreased.

An object of the present disclosure is to reduce reaction force in a nonaqueous electrolyte secondary battery including a winding type electrode assembly.

Hereinafter, the technical configuration, function and effect of the present disclosure will be described. However, the mechanism of the function of the present disclosure includes a presumption. The scope of claims are not limited by whether or not the mechanism of the function is correct.

[1] A nonaqueous electrolyte secondary battery includes an exterior package, an electrode assembly, and an electrolyte solution. The exterior package stores the electrode assembly and the electrolyte solution. The electrode assembly is shaped to have a flat shape. The electrode assembly includes a layered body. The layered body includes a first separator, a positive electrode plate, a second separator, and a negative electrode plate. The first separator, the positive electrode plate, the second separator, and the negative electrode plate are layered in this order. The electrode assembly is formed by spirally winding the layered body. Each of the first separator and the second separator has a proportional limit of less than or equal to 10.2 MPa. The proportional limit is measured in a compression test in a thickness direction of each of the first separator and the second separator.

Hereinafter, in the present disclosure, the "first separator" and the "second separator" may be simply and collectively referred to as "separator". The first separator and the second separator may have substantially the same "material, dimensions, physical property values, and the like". The first separator and the second separator may have different "materials, dimensions, physical property values, and the like".

The electrode assembly of the present disclosure is of a winding type. The layered body is formed by layering the positive electrode plate, the separator, and the negative electrode plate. By spirally winding the layered body, an electrode assembly having a cylindrical shape is formed. The electrode assembly having the cylindrical shape is compressed in the radial direction between two flat plates, with the result that the electrode assembly is shaped to have a flat shape. The shaped electrode assembly includes a flat portion and a curved portion. The curved portion is formed on each of both sides of the flat portion. At the curved portion, the separator is deformed. In the vicinity of the center of the electrode assembly (the inner layer side of the layered body of the electrode assembly), a crease is formed in the separator. The crease is considered to represent plastic deformation of the separator. It is considered that springback is less likely to occur at the portion at which the crease is formed. An amount of deformation of the separator is gradually decreased in a direction from the center of the electrode assembly toward the outer side (the outer layer side of the layered body of the electrode assembly) and finally the crease disappears. In this way, the curved portion is considered to be formed. It is considered that springback is likely to occur at a portion at which no crease is formed in the separator and the separator is curved. In the direction from the center of the electrode assembly toward the outer side, a range in which the crease (plastic deformation) is formed in the separator is larger, i.e., the number of layers in which the crease is formed is larger, the shape loosening is expected to be less likely to occur and the reaction force of the battery is expected to be smaller.

For example, in Japanese Patent Laying-Open No. 2004-214190, an increase in the thickness of the electrode assembly is suppressed by the elastic modulus of the separator being less than or equal to a predetermined value. The elastic modulus is a physical property value in an elastic deformation region. However, as described above, the shape loosening of the electrode assembly and the reaction force of the battery are considered to be related to deformation in a plastic deformation range of more than the proportional limit.

In the present disclosure, the separator has a proportional limit of less than or equal to 10.2 MPa. The proportional limit is an indicator indicating how likely plastic deformation occurs. As the proportional limit is smaller, the separator is more likely to be plastically deformed. That is, it is considered that as the proportional limit is smaller, the crease is formed in a wider range of the separator within the electrode assembly. According to a new finding in the present disclosure, when the proportional limit is less than or equal to 10.2 MPa, the reaction force of the battery is expected to be significantly reduced.

[2] Each of the first separator and the second separator may have the proportional limit of, for example, more than or equal to 4.5 MPa.

When the separator has a proportional limit of more than or equal to 4.5 MPa, improvement in output is expected.

[3] In a cross section that perpendicularly intersects a winding axis of the electrode assembly, the electrode assembly includes a curved portion and a flat portion. The positive electrode plate has a curved surface at the curved portion. The positive electrode plate has a flat surface at the flat portion. For example, 54 or more and 110 or less layers of the positive electrode plate may be layered at the flat portion.

As the number of the layers of the electrode plate at the flat portion is increased, the reaction force of the battery tends to be larger. When the number of the layers of the positive electrode plate is more than or equal to 54, the reaction force is increased significantly. By applying the separator of the present disclosure to the electrode assembly in which the number of the layers of the positive electrode plate is more than or equal to 54, the range of reduction of the reaction force is expected to be larger. If the number of the layers of the positive electrode plate is more than 110, poor welding may be likely to be resulted when welding a current collecting member to the electrode assembly, for example.

[4] In the layered body, a relation of the following formula (1) may be satisfied:

$$x+y+z \leq 210 \quad (1).$$

In the above formula (1).

"x" represents a thickness (μm) of the positive electrode plate.

"y" represents a thickness (μm) of the negative electrode plate.

"z" represents a total of a thickness (μm) of the first separator and a thickness (μm) of the second separator.

When the relation of the formula (1) is satisfied, the shape loosening tends to be less likely to occur.

[5] The battery pack includes one or more cells and a housing. Each of the one or more cells is the nonaqueous electrolyte secondary battery according to any one of [1] to [4]. The housing includes a restraint component. The restraint component restrains each of the one or more cells. The restraint component is composed of a resin material.

Conventionally, in order to reduce reaction force of a battery, a metal material or the like having high rigidity has been used for a restraint component. In the present disclosure, the reaction force of the battery can be sufficiently reduced by the separator. Therefore, a resin material having low rigidity can also be used for the restraint component.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Hereinafter, an embodiment of the present disclosure (hereinafter, also referred to as "the present embodiment") will be described. However, the scope of claims is not limited by the description below.

Each of geometric terms (for example, "perpendicular", and the like) in the present embodiment indicates a state substantially corresponding to the geometric term. The geometric terms in the present embodiment should not be interpreted in a strict sense. For example, the term "perpendicular" indicates a substantially perpendicular state. That is, the term "perpendicular" may be deviated to some extent from the strict definition of the term "perpendicular". The expression "substantially perpendicular state" can surely include, for example, a tolerance, an error, and the like in terms of design, operation, manufacturing, and the like.

In the present embodiment, the description "consisting essentially of" indicates that an additional component can be included in addition to an essential component to such an extent that the object of the present disclosure is not hindered. For example, a normally imaginable component in the technical field (such as an inevitable impurity) can be of course included.

In the present embodiment, for example, a description such as "0.1 part by mass to 10 parts by mass" represents a range including the boundary values unless otherwise stated particularly. For example, the description "0.1 part by mass to 10 parts by mass" indicates a range of "more than or equal to 0.1 parts by mass and less than or equal to 10 parts by mass".

In the present embodiment, when a compound is expressed by a stoichiometric composition formula such as "LiCoO$_2$", the stoichiometric composition formula merely indicates a representative example. For example, when a lithium cobaltate is expressed as "LiCoO$_2$", the lithium cobaltate is not limited to a composition ratio of "Li/Co/O=1/1/2", and can include Li, Co, and O at any composition ratio.

<Nonaqueous Electrolyte Secondary Battery>

Figure 1:
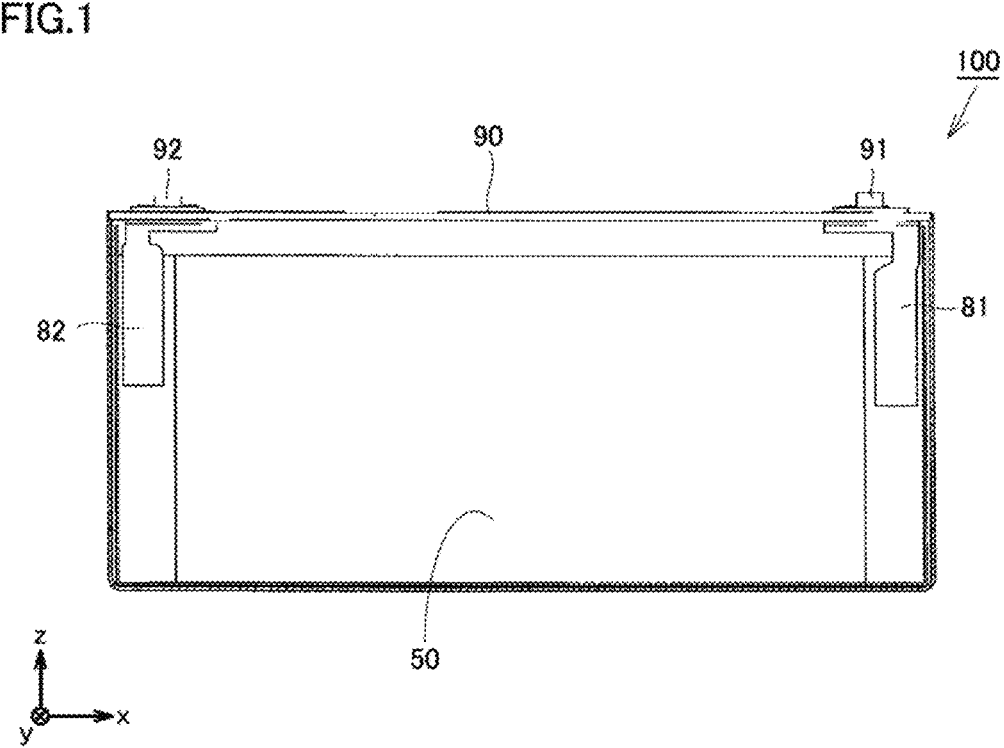
FIG. 1 is a schematic diagram showing an exemplary nonaqueous electrolyte secondary battery according to the present embodiment.

FIG. 1 is a schematic diagram showing an exemplary nonaqueous electrolyte secondary battery according to the present embodiment.

Battery 100 includes an exterior package 90. Exterior package 90 has a prismatic shape (flat rectangular parallelepiped shape). Exterior package 90 may be composed of a metal material, for example. Exterior package 90 may be composed of an aluminum (Al) alloy, for example.

Exterior package 90 stores an electrode assembly 50 and an electrolyte solution (not shown). That is, battery 100 includes electrode assembly 50 and the electrolyte solution. In exterior package 90, electrode assembly 50 may be held in a holder composed of a resin, for example. Electrode assembly 50 is connected to a positive electrode terminal 91 by a positive electrode current collecting member 81. Electrode assembly 50 is connected to a negative electrode terminal 92 by a negative electrode current collecting member 82.

<<Electrode Assembly>>

Figure 2:
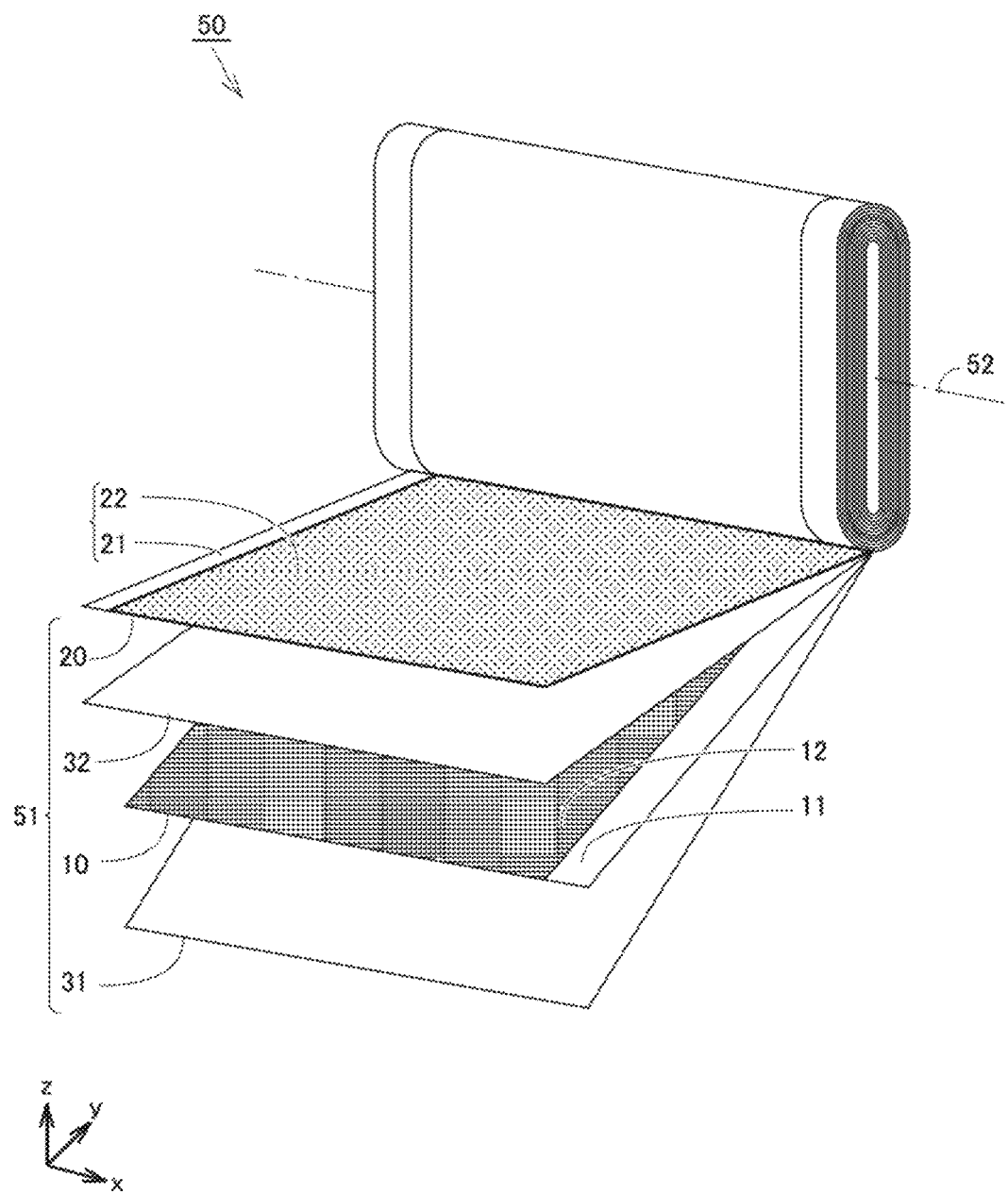
FIG. 2 is a schematic view showing an exemplary electrode assembly according to the present embodiment.

FIG. 2 is a schematic view showing an exemplary electrode assembly in the present embodiment.

Electrode assembly 50 is of a winding type. Electrode assembly 50 is shaped to have a flat shape. Electrode assembly 50 includes a layered body 51. Layered body 51 is spirally wound around a winding axis 52 to form electrode assembly 50.

Layered body 51 includes a first separator 31, a positive electrode plate 10, a second separator 32, and a negative electrode plate 20. First separator 31, positive electrode plate 10, second separator 32, and negative electrode plate 20 are layered in this order. The thickness of layered body 51 (the total of the thickness of first separator 31, the thickness of positive electrode plate 10, the thickness of second separator 32, and the thickness of negative electrode plate 20) may be less than or equal to 210 μm, for example. When layered body 51 has a thickness of less than or equal to 210 μm, a crease is formed in the separator at curved portion 53 during shaping, with the result that the shape loosening tends to be less likely to occur. That is, it is considered that the range in which the crease (plastic deformation) is formed in the separator becomes wider in the direction from the center of electrode assembly 50 toward the outer side (the number of layers in which the crease is formed becomes larger). When layered body 51 has a thickness of more than 210 μm, the crease is less likely to be formed in the separator at curved portion 53 during the shaping, with the result that the shape loosening tends to be likely to occur. In other words, it is considered that the range in which the crease (plastic deformation) is formed in the separator is narrowed (the number of layers in which the crease is formed is decreased) in the direction from the center of electrode assembly 50 to the outer side. The thickness of layered body 51 may be, for example, 135 μm to 200 μm in order to secure initial battery capacity.

That is, in layered body 51, for example, a relation of the following formula (1) may be satisfied:

$$x+y+z \leq 210 \tag{1}$$

In the formula (1),

"x" represents the thickness (μm) of positive electrode plate 10.

"y" represents the thickness (μm) of negative electrode plate 20

"z" represents the total of the thickness (μm) of first separator 31 and the thickness (μm) of second separator 32. The thickness (μm) of first separator 31 may be substantially the same as or different from the thickness (μm) of second separator 32.

Alternatively, in layered body 51, for example, a relation of the following formula (2) may be satisfied:

$$135 \leq x+y+z \leq 200 \tag{2}$$

"x, y, z" in the formula (2) are the same as "x, y, z" in the formula (1).

Further, in the formulae (1) and (2), for example, relations of the following formulae (3) to (5) may be satisfied:

$$x \leq 80 \tag{3},$$

$$y \leq 80 \tag{4, and}$$

$$z \leq 50 \tag{5}.$$

When the relations of the formulae (3) to (5) are further satisfied, the reaction force is expected to be reduced.

Figure 3:
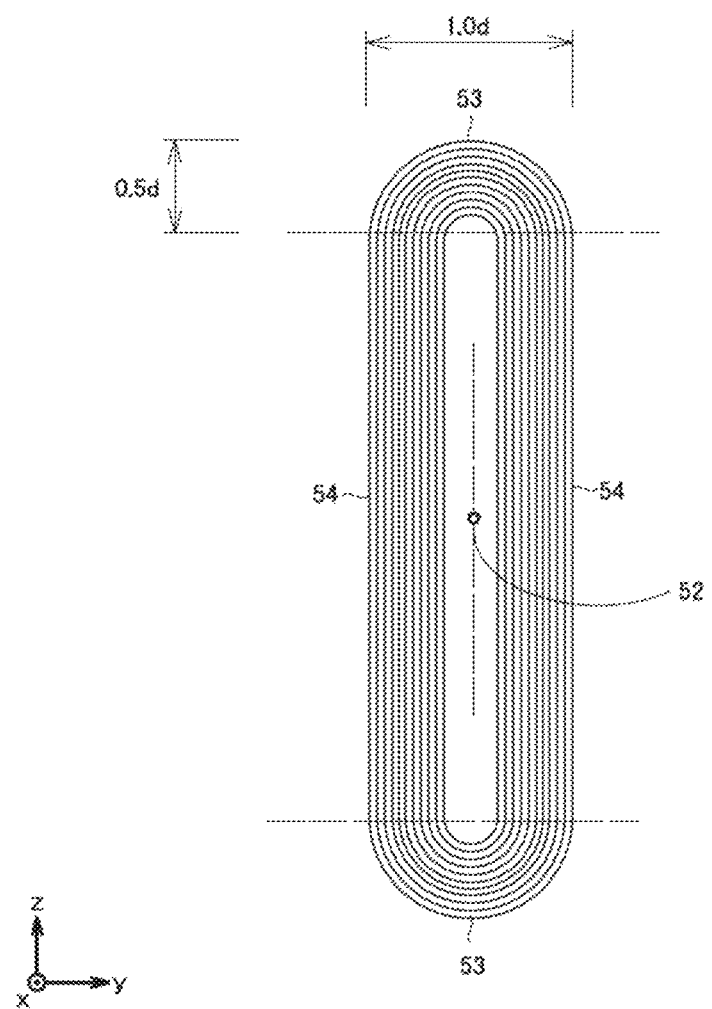
FIG. 3 is a schematic cross sectional view showing an exemplary electrode assembly.

FIG. 3 is a schematic cross sectional view showing an exemplary electrode assembly.

FIG. 3 shows a cross section that perpendicularly intersects winding axis 52 (see FIG. 2). Electrode assembly 50 includes a curved portion 53 and a flat portion 54. Curved portion 53 is formed on each of both sides of flat portion 54. At curved portion 53, layered body 51 is curved in the form of an arc. At curved portion 53, each of positive electrode plate 10, negative electrode plate 20, and the separator has a curved surface. At flat portion 54, each of positive electrode plate 10, negative electrode plate 20, and the separator has a flat surface. When the cross section of curved portion 53 is regarded as an arc, a circle including the arc has a radius of 0.5 d. Flat portion 54 has a thickness of 1.0 d.

(Number of Layers)

In the present embodiment, the "number of layers" is counted at flat portion 54. For example, when counting the number of layers of positive electrode plate 10, a portion of positive electrode plate 10 reaching flat portion 54 is regarded as one layer. The number of the layers of positive electrode plate 10 may be, for example, more than or equal to 54 and less than or equal to 110. By applying the separator of the present embodiment to electrode assembly 50 in which the number of the layers of positive electrode plate 10 is more than or equal to 54, a range of reduction of the reaction force is expected to be large. If the number of the layers of positive electrode plate 10 is more than 110, poor welding may be resulted when welding a positive electrode current collecting member 81 to electrode assembly 50. The number of the layers of positive electrode plate 10 may be, for example, more than or equal to 58. The number of the layers of positive electrode plate 10 may be, for example, more than or equal to 82. The number of the layers of positive electrode plate 10 may be, for example, less than or equal to 100

<<Separator>>

Electrode assembly 50 of the present embodiment includes first separator 31 and second separator 32. In electrode assembly 50, at least a portion of the separator is interposed between positive electrode plate 10 and negative electrode plate 20. The separator separates positive electrode plate 10 and negative electrode plate 20 from each other.

The separator is a sheet in the form of a strip. The separator may have a thickness of, for example, less than or equal to 25 μm. When the separator has a thickness of less than or equal to 25 μm, the shape loosening tends to be less likely to occur. The separator may have a thickness of, for example, 5 μm to 20 μm. The separator may have a thickness of, for example, 14 μm to 23 μm. The separator may have a thickness of, for example, 14 μm to 20 μm. The separator may have a thickness of 14 μm to 19 μm, for example. The separator may have a thickness of, for example, 19 μm to 23 μm. The separator may have a thickness of, for example, 20 μm to 23 μm.

The separator is electrically insulative. The separator may be composed of polyolefin, for example. The separator may be composed of polyethylene (PE), for example. The separator may be composed of polypropylene (PP), for example. The separator may have a single-layer structure, for example. The separator may consist of a PE layer, for example. The separator may have, for example, a multilayer structure. The separator may include, for example, a PP layer, a PE layer, and a PP layer. The PP layer, the PE layer, and the PP layer may be layered in this order. For example, a ceramic particle layer or the like may be formed on a surface of the separator.

The separator is porous. The separator may have a porosity of, for example, 40% to 60%. The separator may have a porosity of, for example, 50% to 60%. The porosity can be measured by a mercury porosimeter. The separator may have an air permeability of, for example, 200 s/100 ml to 300 s/100 ml. The air permeability can be measured by an Oken type air permeability meter.

(Proportional Limit)

The term "proportional limit" indicates a limit of stress at which a proportional relation between stress and strain (Hooke's law) is established when a solid is deformed due to external force. The separator of the present embodiment has a proportional limit of less than or equal to 10.2 MPa. When the separator has a proportional limit of less than or equal to 10.2 MPa, the reaction force is expected to be reduced. The separator may have a proportional limit of for example, less than or equal to 9.7 MPa. The separator may have a proportional limit of, for example, less than or equal to 8.8 MPa. The separator may have a proportional limit of, for example, less than or equal to 7.8 MPa.

The separator may have a proportional limit of more than or equal to 4.5 MPa, for example. When the separator has a proportional limit of more than or equal to 4.5 MPa, improvement in output is expected. The separator may have a proportional limit of, for example, more than or equal to 6.2 MPa.

(Method of Measuring Proportional Limit)

The proportional limit of the present embodiment is measured in a compression test in the thickness direction of the separator. First, a test piece is prepared. Electrode assembly 50 is collected from battery 100. The separator is collected from electrode assembly 50. The test piece is cut out from the separator. The test piece is collected from a portion of electrode assembly 50 corresponding to curved portion 53. The physical property of a portion corresponding to flat portion 54 may be changed due to an influence of shaping pressure. Further, the test piece is collected from a portion external to the 30th layer when counted from the center of electrode assembly 50. The test piece has a quadrangular shape with sides each having a length of more than or equal to 1 cm (the test piece is sized to be larger than the plane size of an indenter described later). 172 test pieces are prepared. The 172 test pieces may be collected from batteries having the same specification.

A compression tester is prepared. For example, the autograph "AG-50kNG W975" manufactured by Shimadzu Corporation may be used. A tester having a function equivalent thereto may be used.

The indenter is attached to the compression tester. The indenter is a block composed of a stainless steel material (SUS). The indenter has a planar size of 1 cm×1 cm.

The 172 test pieces are layered to form a layered body. The layered body is placed on a sample stage of the compression tester. The indenter is pressed onto the layered body along the layering direction of the layered body (that is, the thickness direction of the separator).

The indenter is manually pressed onto the layered body until the compression stress reaches 75 N (0.075 MPa). After the compression stress reaches 75 N, the pressing of the indenter is continued to attain a compression stress increase rate of 666.5 N/s (0.6665 MPa/s). When the compression stress reaches 1500 N (1.5 MPa), the pressing of the indenter is stopped. In this way, a stress-strain curve is obtained. In the stress-strain curve, a limit of stress is measured at which the proportional relation between stress and strain (Hooke's law) is established. The proportional limit is effective up to the first decimal place. The second and subsequent decimal places are rounded off.

In the stress-strain curve, an elastic modulus can be calculated in accordance with the slope of a region in which the stress and strain have the proportional relation. The separator may have an elastic modulus of, for example, 180 MPa to 210 MPa. The separator may have an elastic modulus of, for example, 188 MPa to 208 MPa.

<<Positive Electrode Plates>>

Figure 4:
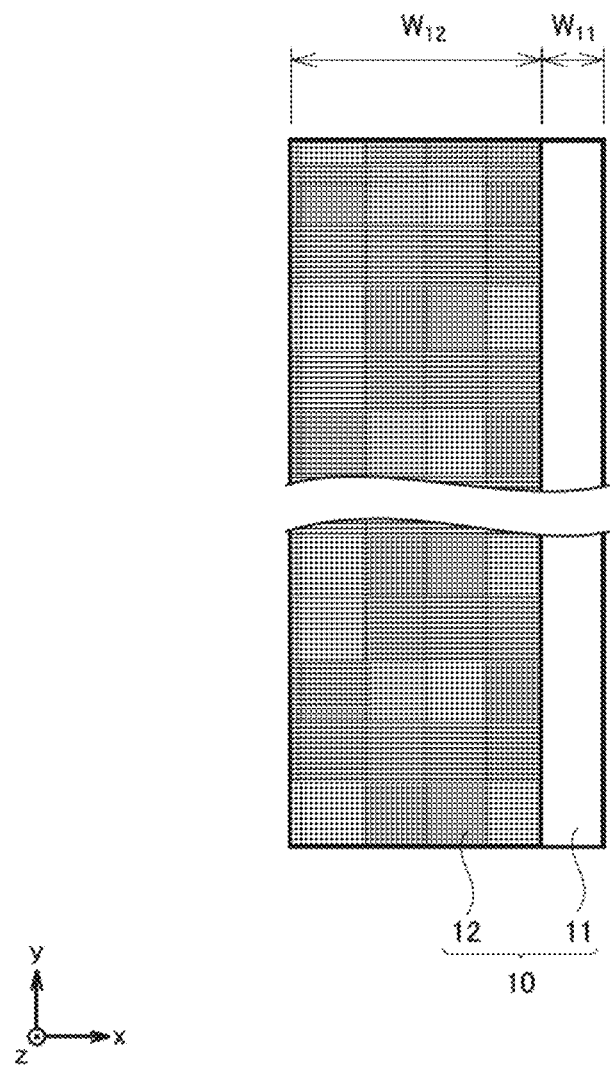
FIG. 4 is a schematic plan view showing an exemplary positive electrode plate in the present embodiment.

FIG. 4 is a schematic plan view showing an exemplary positive electrode plate in the present embodiment.

Positive electrode plate 10 is a sheet in the form of a strip. Positive electrode plate 10 may have a thickness of, for example, 10 μm to 100 μm. Positive electrode plate 10 may have a thickness of, for example, less than or equal to 81 μm. When positive electrode plate 10 has a thickness of less than or equal to 81 μm, the shape loosening tends to be less likely to occur. Positive electrode plate 10 may have a thickness of, for example, 50 μm to 81 μm. Positive electrode plate 10 may have a thickness of, for example, 50 μm to 75 μm. Positive electrode plate 10 may have a thickness of, for example, 75 μm to 81 μm.

Positive electrode plate 10 includes a positive electrode substrate 11 and a positive electrode active material layer 12. Positive electrode substrate 11 may be, for example, an aluminum (Al) alloy foil or the like. Positive electrode substrate 11 may have a thickness of 10 μm to 20 μm, for example. Positive electrode active material layer 12 is disposed on a surface of positive electrode substrate 11. Positive electrode active material layer 12 may be disposed on only one surface of positive electrode substrate 11. Positive electrode active material layer 12 may be disposed on each of front and rear surfaces of positive electrode substrate 11. A portion of positive electrode substrate 11 is exposed from positive electrode active material layer 12. Hereinafter, the exposed portion of positive electrode substrate 11 is also referred to as "positive electrode substrate exposed portion". The positive electrode substrate exposed portion is disposed at one end portion in the short side direction (x axis direction in FIG. 4). The positive electrode substrate exposed portion extends in the long side direction (y axis direction in FIG. 4). The positive electrode substrate exposed portion can be used for connection between electrode assembly 50 and positive electrode terminal 91.

Positive electrode active material layer 12 may have a density of 2 g/cm$^3$ to 3 g/cm$^3$, for example. Positive electrode active material layer 12 may have a density of 2.4 g/cm$^3$ to 2.6 g/cm$^3$, for example. Positive electrode active material layer 12 includes a positive electrode active material Positive electrode active material layer 12 may consist essentially of the positive electrode active material.

The positive electrode active material can include any component. For example, the positive electrode active material may include at least one selected from a group consisting of $LiCoO_2$, $LiNiO_2$, $LiMnO_2$, $LiMn_2O_4$, $Li(NiCoMn)O_2$, $Li(NiCoAl)O_2$, and $LiFePO_4$. Here, for example, a description such as "(NiCoMn)" in a composition formula such as "$Li(NiCoMn)O_2$" indicates that the total of the composition ratios in the parentheses is 1. Positive electrode active material layer 12 may further include, for example, a conductive material, a binder, and the like in addition to the positive electrode active material. The conductive material can include any component. The conductive material may include acetylene black or the like, for example. A blending amount of the conductive material may be, for example, 0.1 part by mass to 10 parts by mass with respect to 100 parts by mass of the positive electrode active material. The binder can include any component. For example, the binder may include polyvinylidene difluoride (PVDF) or the like. A blending amount of the binder may be, for example, 0.1 part by mass to 10 pans by mass with respect to 100 parts by mass of the positive electrode active material.

<<Negative Electrode Plate>>

Figure 5:
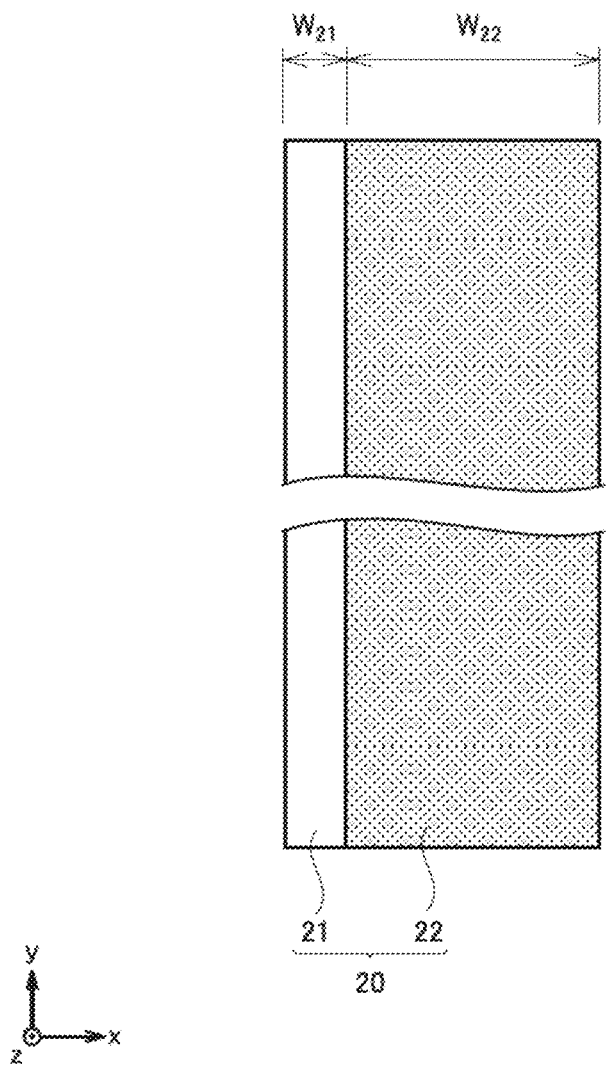
FIG. 5 is a schematic plan view showing an exemplary negative electrode plate in the present embodiment.

FIG. 5 is a schematic plan view showing an exemplary negative electrode plate in the present embodiment.

Negative electrode plate 20 is a sheet in the form of a strip. Negative electrode plate 20 may have a thickness of 10 µm to 100 µm, for example. Negative electrode plate 20 may have a thickness of less than or equal to 83 µm, for example. When negative electrode plate 20 has a thickness of less than or equal to 83 µm, the shape loosening tends to be less likely to occur. Negative electrode plate 20 may have a thickness of 57 µm to 83 µm, for example. Negative electrode plate 20 may have a thickness of 57 µm to 76 µm, for example. Negative electrode plate 20 may have a thickness of 76 µm to 83 µm, for example.

Negative electrode plate 20 includes a negative electrode substrate 21 and a negative electrode active material layer 22. Negative electrode substrate 21 may be, for example, a copper (Cu) alloy foil or the like. Negative electrode substrate 21 may have a thickness of 5 µm to 10 µm, for example. Negative electrode active material layer 22 is disposed on a surface of negative electrode substrate 21. Negative electrode active material layer 22 may be disposed on only one surface of negative electrode substrate 21. Negative electrode active material layer 22 may be disposed on each of front and rear surfaces of negative electrode substrate 21. A portion of negative electrode substrate 21 is exposed from negative electrode active material layer 22. Hereinafter, the exposed portion of negative electrode substrate 21 is also referred to as "negative electrode substrate exposed portion". The negative electrode substrate exposed portion is disposed at one end portion in a short side direction (x axis direction in FIG. 5). The negative electrode substrate exposed portion extends in a long side direction (y axis direction in FIG. 5). The negative electrode substrate exposed portion can be used for connection between electrode assembly 50 and negative electrode terminal 92.

Negative electrode active material layer 22 may have a density of 1.05 g/cm$^3$ to 1.2 g/cm$^3$, for example. Negative electrode active material layer 22 may have a density of 1.1 g/cm$^3$ to 1.12 g/cm$^3$, for example. Negative electrode active material layer 22 includes a negative electrode active material. Negative electrode active material layer 22 may consist essentially of the negative electrode active material.

The negative electrode active material can include any component. For example, the negative electrode active material may include at least one selected from a group consisting of graphite, soft carbon, hard carbon, silicon, silicon oxide, a silicon-based alloy, tin, tin oxide, a tin-based alloy, and $Li_4Ti_5O_{12}$ Negative electrode active material layer 22 may further include, for example, a conductive material, a binder, and the like in addition to the negative electrode active material. The conductive material can include any component. For example, the conductive material may include at least one selected from a group consisting of acetylene black, a vapor-grown carbon fiber, and a carbon nanotube. A blending amount of the conductive material may be, for example, 0.1 part by mass to 10 parts by mass with respect to 100 parts by mass of the negative electrode active material. The binder can include any component. For example, the binder may include at least one selected from a group consisting of a styrene-butadiene rubber (SBR), a carboxymethyl cellulose (CMC), and a polyacrylic acid (PAA). A blending amount of the binder may be, for example, 0.1 part by mass to 10 parts by mass with respect to 100 parts by mass of the negative electrode active material.

<<Electrolyte Solution>>

Electrode assembly 50 is impregnated with at least part of the electrolyte solution. Electrode assembly 50 may be impregnated with a whole of the electrolyte solution. Electrode assembly 50 may be impregnated with part of the electrolyte solution. Part of the electrolyte solution may be stored outside electrode assembly 50. The electrolyte solution is a liquid electrolyte. The electrolyte solution includes a solvent and a supporting electrolyte. The solvent is aprotic. The solvent can include any component. For example, the solvent may include at least one selected from a group consisting of ethylene carbonate (EC), propylene carbonate (PC), ethyl methyl carbonate (EMC), dimethyl carbonate (DMC), and diethyl carbonate (DEC). The supporting electrolyte is dissolved in the solvent. The supporting electrolyte can include any component. For example, the supporting electrolyte may include at least one selected from a group consisting of $LiPF_6$, $LiBF_4$, $LiN(FSO_2)_2$, and $LiB(C_2O_4)_2$. The electrolyte solution may further include any additive in addition to the solvent and the supporting electrolyte.

<Battery Pack>

Figure 10:
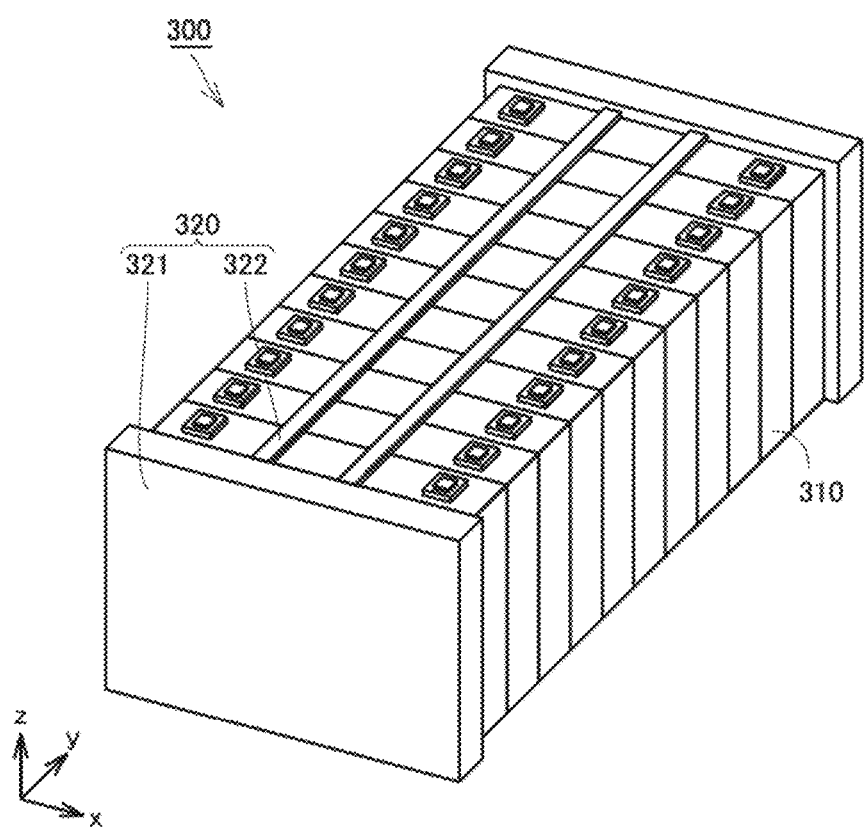
FIG. 10 is a schematic diagram showing an exemplary battery pack according to the present embodiment.

FIG. 10 is a schematic diagram showing an exemplary battery pack according to the present embodiment.

Battery pack 300 includes one or more cells 310 and a housing. Each cell 310 is the above-described nonaqueous electrolyte secondary battery of the present embodiment. Battery pack 300 may include, for example, 1 to 100 cells 310. Battery pack 300 may include, for example, 2 to 20 cells 310. When battery pack 300 includes a plurality of cells 310, the plurality of cells 310 are arranged in a predetermined direction. In FIG. 10, the plurality of cells 310 are arranged in the y axis direction. The direction in which cells 310 are arranged is also referred to as "arrangement direction". The plurality of cells 310 may be electrically connected in series. The plurality of cells 310 may be electrically connected in parallel. A group of electrically connected cells 310 is also referred to as a "battery module".

The housing includes, for example, an accommodation box (not shown) and a restraint component 320. The accommodation box accommodates cell(s) 310 and restraint component 320. Restraint component 320 includes, for example, two end plates 321 and a band 322. End plates 321 are disposed at the respective ends in the arrangement direction. Band 322 couples two end plates 321 to each other such that a distance between two end plates 321 falls within a predetermined range. Thus, cell(s) 310 sandwiched between two end plates 321 are restrained. That is, restraint component 320 restrains cell(s) 310.

Restraint component 320 in the present embodiment may be composed of a material having low rigidity. This is because each cell 310 can exhibit small reaction force. The restraint component may be composed of, for example, a resin material. For example, at least one of each end plate 321 and band 322 may be composed of a resin material.

EXAMPLES

The following describes an example of the present disclosure (hereinafter, also referred to as "the present example"). However, the scope of claims is not limited by the description below.

<Manufacturing of Test Battery>

<<No. 1>>

A test battery of the present example was manufactured in the following procedure.

A positive electrode slurry was prepared by mixing a positive electrode active material [Li(NiCoMn)O$_2$], a conductive material (acetylene black), a binder (PVDF), and a dispersion medium (N-methyl-2-pyrrolidone). The positive electrode slurry was applied to a surface of a positive electrode substrate (Al alloy foil; thickness of 15 μm) and was dried, thereby forming a positive electrode active material layer. Thus, a raw positive electrode was produced. The raw positive electrode was compressed and was cut into a predetermined size, thereby manufacturing a positive electrode plate. The positive electrode plate had the following planar dimensions.

Width of the positive electrode substrate exposed portion ($W_{11}$, see FIG. 4): 10 mm Width of the positive electrode active material layer ($W_{12}$, see FIG. 4): 110 mm A negative electrode slurry was prepared by mixing a negative electrode active material (natural graphite), a binder (CMC. SBR) and a dispersion medium (water). The negative electrode slurry was applied to a surface of a negative electrode substrate (Cu alloy foil; thickness of 8 μm) and was dried, thereby forming a negative electrode active material layer. Thus, a raw negative electrode was produced. The raw negative electrode was compressed and was cut into a predetermined size, thereby manufacturing a negative electrode plate. The negative electrode plate had the following planar dimensions.

Width of the negative electrode substrate exposed portion ($W_{21}$, see FIG. 5): 13 mm Width of the negative electrode active material layer ($W_{22}$, see FIG. 5): 115 mm A first separator and a second separator were prepared. The first separator and the second separator in the present example had the same specification. The physical properties of each separator are shown in Table 1 below. It should be noted that the "proportional limit" in Table 1 below is a value measured in the separator collected from the battery after measurement of the output and reaction force.

The first separator, the positive electrode plate, the second separator, and the negative electrode plate were layered in this order to form a layered body. The layered body was spirally wound to form an electrode assembly having a cylindrical shape. The electrode assembly having the cylindrical shape was compressed in the radial direction by a flat plate pressing machine. In this way, the electrode assembly was shaped to have a flat shape. In the electrode assembly, the number of layers of the negative electrode plate was set to be larger by two layers than the number of layers of the positive electrode plate. The total number of the layers of the first separator and the second separator was set to be larger by eight layers than the number of layers that is twice as large as the number of the layers of the positive electrode plate.

An exterior package was prepared. The exterior package has a prismatic shape. The exterior package was composed of an Al alloy. The dimensions of the exterior package are shown in Table 1 below. The "outer dimension" in Table 1 below represents the outer dimension in the y axis direction of FIG. 1. The "thickness" in Table 1 below represents the thickness (plate thickness) of the exterior package material.

The exterior package consisted of a container and a cover. The cover was provided with a positive electrode terminal and a negative electrode terminal. The positive electrode terminal and the electrode assembly were electrically connected to each other by a positive electrode current collecting member. The negative electrode terminal and the electrode assembly were electrically connected to each other by a negative electrode current collecting member. The electrode assembly was inserted in a pouch-shaped holder. The holder was composed of a resin film (material: PP; thickness: 0.15 mm). The electrode assembly was stored in the container together with the holder. The cover and the container were joined to each other by laser welding. The electrolyte solution was injected into the exterior package from a liquid injection hole provided in the cover. The electrode assembly was impregnated with the electrolyte solution. The electrolyte solution included the following components.

Solvent. EC/EMC/DEC=3/3/4 (volume ratio)

Supporting electrolyte: LiPF$_6$ (concentration of 1 mol/L)

In this way, the battery was manufactured. After the injection of the electrolyte solution, the battery was charged by a predetermined amount with the liquid injection hole being opened. During the charging, gas generated from the electrode assembly was ejected from the liquid injection hole. After the charging, the liquid injection hole was closed by a sealing plug <<No. 2 to No. 12>>

As shown in Table 1 below, a test battery was manufactured in the same manner as in No. 1 except that the proportional limit of the separator, the number of the layers of the positive electrode plate, and the like were changed. The "air permeability" in Table 1 below is a relative value when the air permeability of the separator in No. 1 is defined as 100%.

<Evaluations>

<<Measurement of Reaction Force>>

Figure 6:
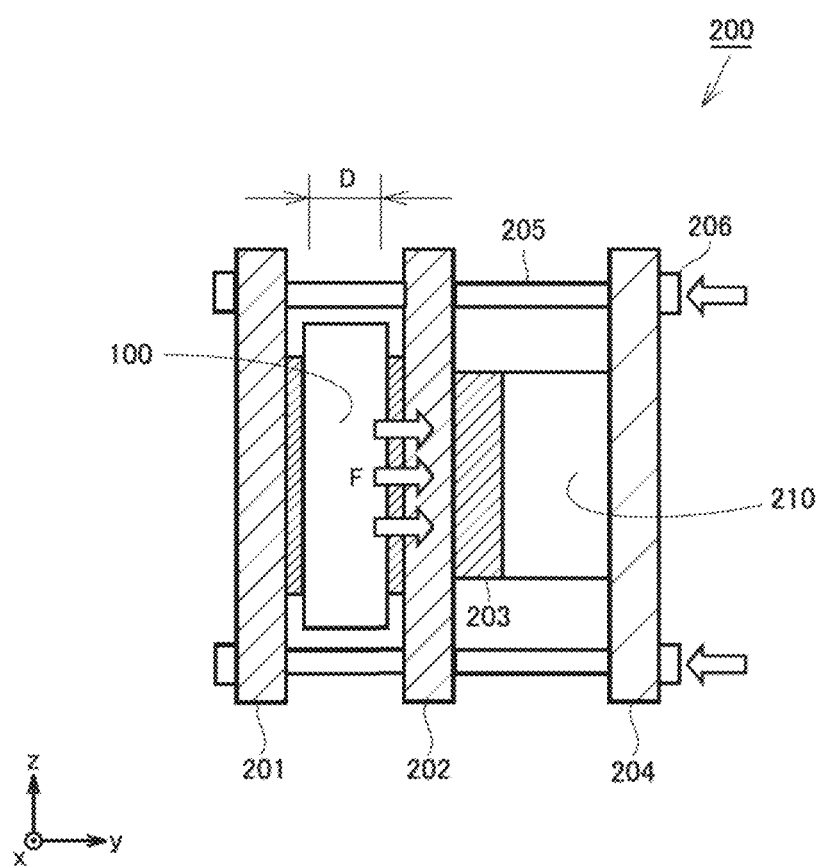
FIG. 6 is a schematic diagram showing a method of measuring reaction force.

FIG. 6 is a schematic diagram showing a method of measuring reaction force.

A pressing jig 200 is prepared. Pressing jig 200 includes a first plate 201, a second plate 202, a third plate 203, a fourth plate 204, bolts 205, and nuts 206. Each plate may be composed of SUS, for example. Each plate may have a thickness of, for example, more than or equal to 13 mm. Protrusions are formed on surfaces of first plate 201 and second plate 202. Each of the protrusions has a height of 2 mm. Each of bolts 205 extends through first plate 201, second plate 202, third plate 203, and fourth plate 204. First plate 201, second plate 202, third plate 203, and fourth plate 204 are fastened by bolts 205 and nuts 206. A load cell 210 is disposed between third plate 203 and fourth plate 204. Load cell 210 may be, for example, the model type "CMP1-2T" manufactured by MinebeaMitsumi. A load cell having a function equivalent to that of the above device may be used. Battery 100 is sandwiched by first plate 201 and second plate 202. That is, battery 100 is restrained. First plate 201 and second plate 202 are fixed such that the outer dimension (outer dimension in the y axis direction) of battery 100 becomes a predetermined value, thereby outputting pressure to load cell 210. The pressure is regarded as the "reaction force (F)". Here, load cell 210 is arranged horizontal to battery 100 so as to avoid the weight of pressing jig 200 from affecting the value of the reaction force.

The outer dimension of battery 100 when first plate 201 and second plate 202 are fixed is also denoted as "restraint dimension (D)". The restraint dimension in the present example had a value smaller by about 0.1 mm than the original outer dimension of the exterior package.

After battery 100 was restrained by first plate 201 and second plate 202, battery 100 was charged from 3.4 V to 4.2 V by constant current (CC) charging with 1 It. After reaching 4.2V, battery 100 was charged by constant voltage (CV) charging for 15 minutes. In this way, the battery was fully charged. After the charging, the reaction force was measured. The reaction force is shown in Table 1 below. It should be noted that the symbol "It" represents an hour rate of current. With a current of 1 It, the fully charged capacity is discharged in one hour.

<<Measurement of Output>>

The battery was charged to 3.699 V for 90 minutes by constant current-constant voltage (CC-CV) charging under a temperature environment of 25° C. After a rest of 10 minutes after the charging, the battery was discharged for 10 seconds with a current of 40 A. The output was calculated in accordance with the below-described formulae (6) and (7). The output is shown in Table 1 below. The output in Table 1 below is a relative value when the output of No. 1 is defined as 100%.

$$I_P = 40 \times (V_0 - 3)/(V_0 - V_{10})) \quad (6)$$

$$Q = 3 \times I_P \quad (7)$$

"$I_p$" represents a current when the voltage reaches 3 V due to discharging for 10 seconds.

"$V_0$" represents a voltage at the start of the discharging.

"$V_{10}$" represents a voltage after passage of 10 seconds from the start of the discharging.

TABLE 1

| | | | No. 1 | No. 2 | No. 3 | No. 4 | No. 5 | No. 6 | No. 7 |
|---|---|---|---|---|---|---|---|---|---|
| Positive Electrode Plate | Thickness x | (μm) | 75 | 75 | 75 | 75 | 75 | 75 | 75 |
| Negative Electrode Plate | Thickness y | (μm) | 76 | 76 | 76 | 76 | 76 | 76 | 76 |
| Separator | Thickness 0.5 z | (μm) | 19 | 20 | 19 | 19 | 19 | 19 | 19 |
| | Air Permeability | (%) | 100 | 101 | 95 | 102 | 97 | 101 | 102 |
| | Elastic Modulus | (MPA) | 188 | 203 | 208 | 199 | 204 | 188 | 199 |
| | Proportional Limit | (MPA) | 9.7 | 8.8 | 7.8 | 6.2 | 4.5 | 9.7 | 6.2 |
| Layered Body | Thickness x + y + z | (μm) | 189 | 191 | 189 | 189 | 189 | 189 | 189 |
| Number of Layers | Positive Electrode Plate | (Layer) | 82 | 82 | 82 | 82 | 82 | 50 | 50 |
| | Negative Electrode Plate | (Layer) | 84 | 84 | 84 | 84 | 84 | 52 | 52 |
| | Separator | (Layer) | 172 | 172 | 172 | 172 | 172 | 108 | 108 |
| Electrode Assembly | Thickness | (mm) | 15.7 | 15.7 | 15.7 | 15.7 | 15.7 | 9.6 | 9.6 |
| Exterior Package | Thickness | (mm) | 0.1 | 0.1 | 0.1 | 0.1 | 0.1 | 0.1 | 0.1 |
| | Outer Dimension | (mm) | 17.5 | 17.5 | 17.5 | 17.5 | 17.5 | 11.4 | 11.4 |
| Holder | Thickness | (mm) | 0.15 | 0.15 | 0.15 | 0.15 | 0.15 | 0.15 | 0.15 |
| Evaluations | Restraint Dimension D (during Measurement of Reaction Force) | (mm) | 17.4 | 17.4 | 17.4 | 17.4 | 17.4 | 11.3 | 11.3 |
| | Reaction Force | (kPa) | 494 | 441 | 382 | 311 | 287 | 277 | 251 |
| | Output | (%) | 100 | 100 | 99 | 99 | 98 | 55 | 55 |

| | | | No. 8 | No. 9 | No. 10 | No. 11 | No. 12 |
|---|---|---|---|---|---|---|---|
| Positive Electrode Plate | Thickness x | (μm) | 75 | 75 | 81 | 50 | 75 |
| Negative Electrode Plate | Thickness y | (μm) | 76 | 76 | 83 | 57 | 75 |
| Separator | Thickness 0.5 z | (μm) | 19 | 19 | 23 | 14 | 19 |
| | Air Permeability | (%) | 102 | 101 | 105 | 93 | 113 |
| | Elastic Modulus | (MPA) | 188 | 188 | 188 | 189 | 192 |
| | Proportional Limit | (MPA) | 9.7 | 9.7 | 9.1 | 9.5 | 10.7 |
| Layered Body | Thickness x + y + z | (μm) | 189 | 189 | 210 | 135 | 188 |
| Number of Layers | Positive Electrode Plate | (Layer) | 58 | 100 | 82 | 82 | 82 |
| | Negative Electrode Plate | (Layer) | 60 | 102 | 84 | 84 | 84 |
| | Separator | (Layer) | 124 | 208 | 172 | 172 | 172 |
| Electrode Assembly | Thickness | (mm) | 11.1 | 19.1 | 15.7 | 15.7 | 15.7 |
| Exterior Package | Thickness | (mm) | 0.1 | 0.1 | 0.1 | 0.1 | 0.1 |
| | Outer Dimension | (mm) | 13 | 21 | 17.5 | 7.5 | 17.5 |

TABLE 1-continued

| | | | | | | | |
|---|---|---|---|---|---|---|---|
| Holder Evaluations | Thickness | (mm) | 0.15 | 0.15 | 0.15 | 0.15 | 1.15 |
| | Restraint Dimension D (during Measurement of Reaction Force) | (mm) | 12.9 | 20.9 | 17.4 | 17.4 | 17.4 |
| | Reaction Force | (kPa) | 292 | 705 | 634 | 219 | 797 |
| | Output | (%) | 85 | 138 | 89 | 121 | 98 |

<Results:>
<<Relation Between Proportional Limit of Separator and Reaction Force>>

Figure 7:
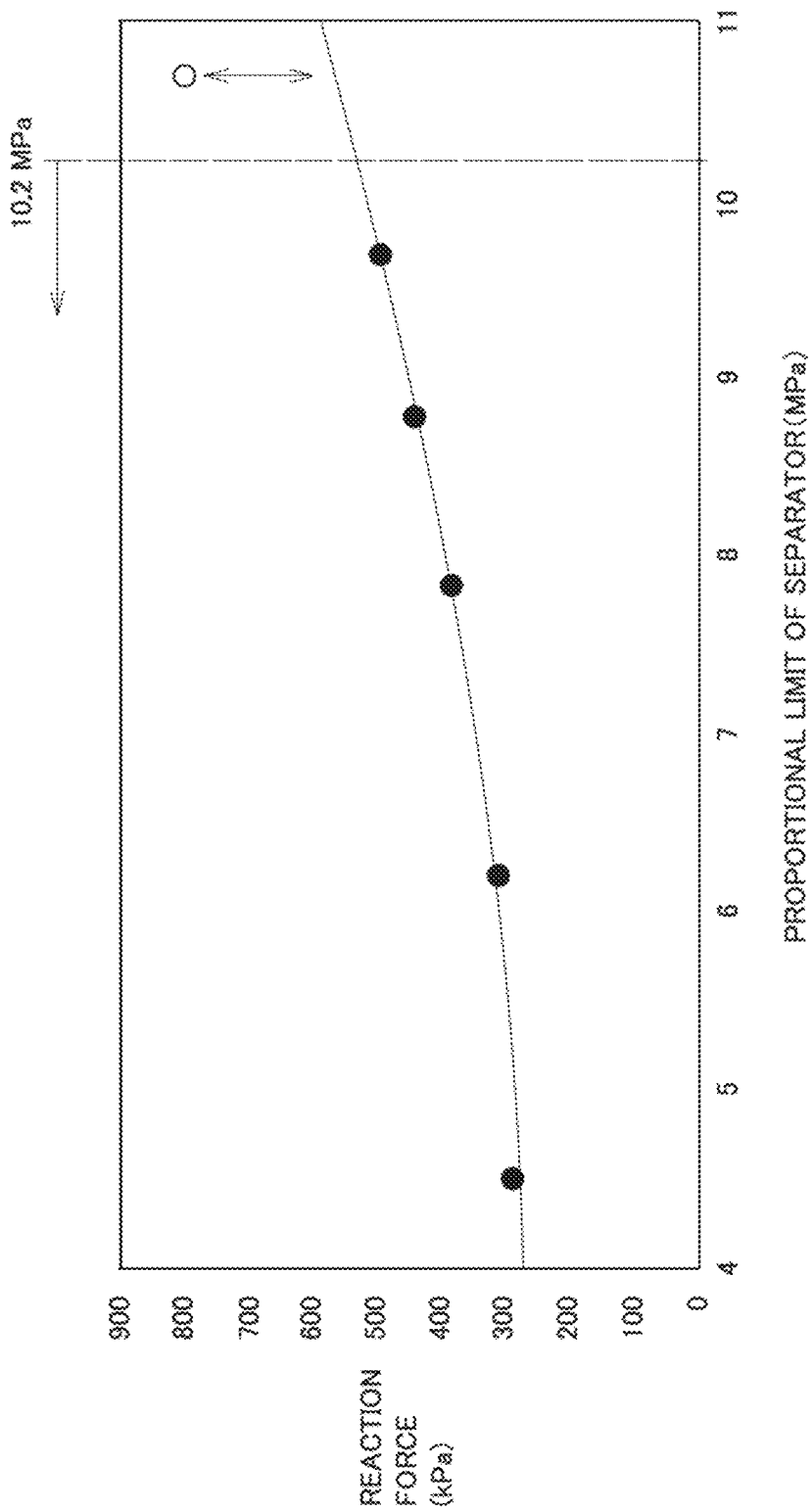
FIG. 7 is a graph showing a relation between a proportional limit of a separator and the reaction force.

FIG. 7 is a graph showing a relation between the proportional limit of the separator and the reaction force.

FIG. 7 shows results of No. 1 to No. 5 and No. 12. When the proportional limit of the separator is less than or equal to 10.2 MPa, the reaction force is significantly reduced. When the proportional limit is less than or equal to 9.7 MPa, the reaction force is gradually decreased as the proportional limit is decreased.

When the proportional limit is 10.7 MPa (No. 12), the reaction force is very large. It is considered that the shape loosening has occurred.

<<Relation Between Proportional Limit of Separator and Output>>

Figure 8:
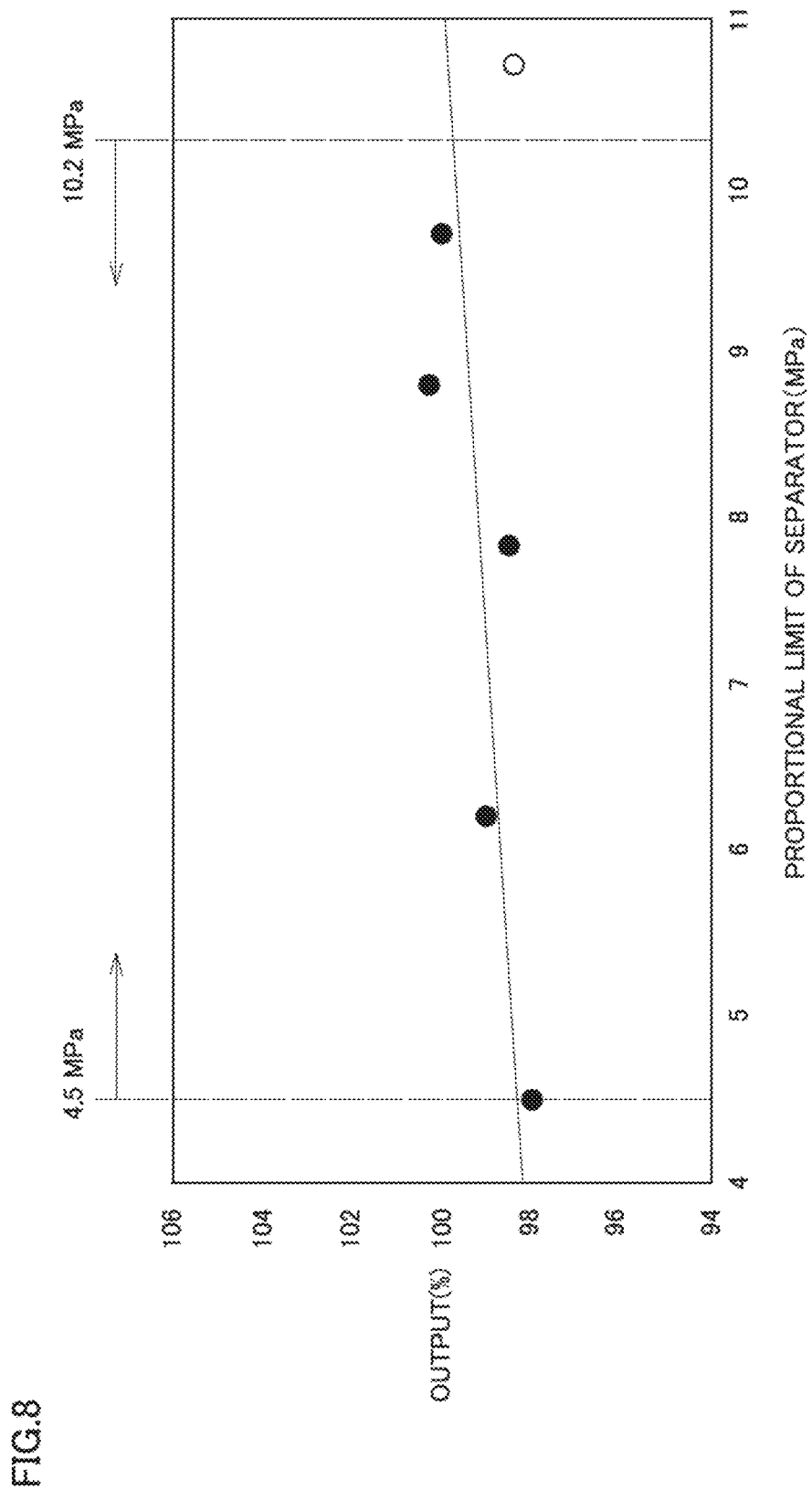
FIG. 8 is a graph showing a relation between the proportional limit of the separator and an output.

FIG. 8 is a graph showing a relation between the proportional limit of the separator and the output.

FIG. 8 shows results of No. 1 to No. 5 and No. 12. It is observed that as the proportional limit becomes larger, the output tends to be gradually increased. When the proportional limit is more than or equal to 4.5 MPa, improvement in output is expected.

<<Relation Between the Number of Layers of Positive Electrode Plate and Reaction Force>>

Figure 9:
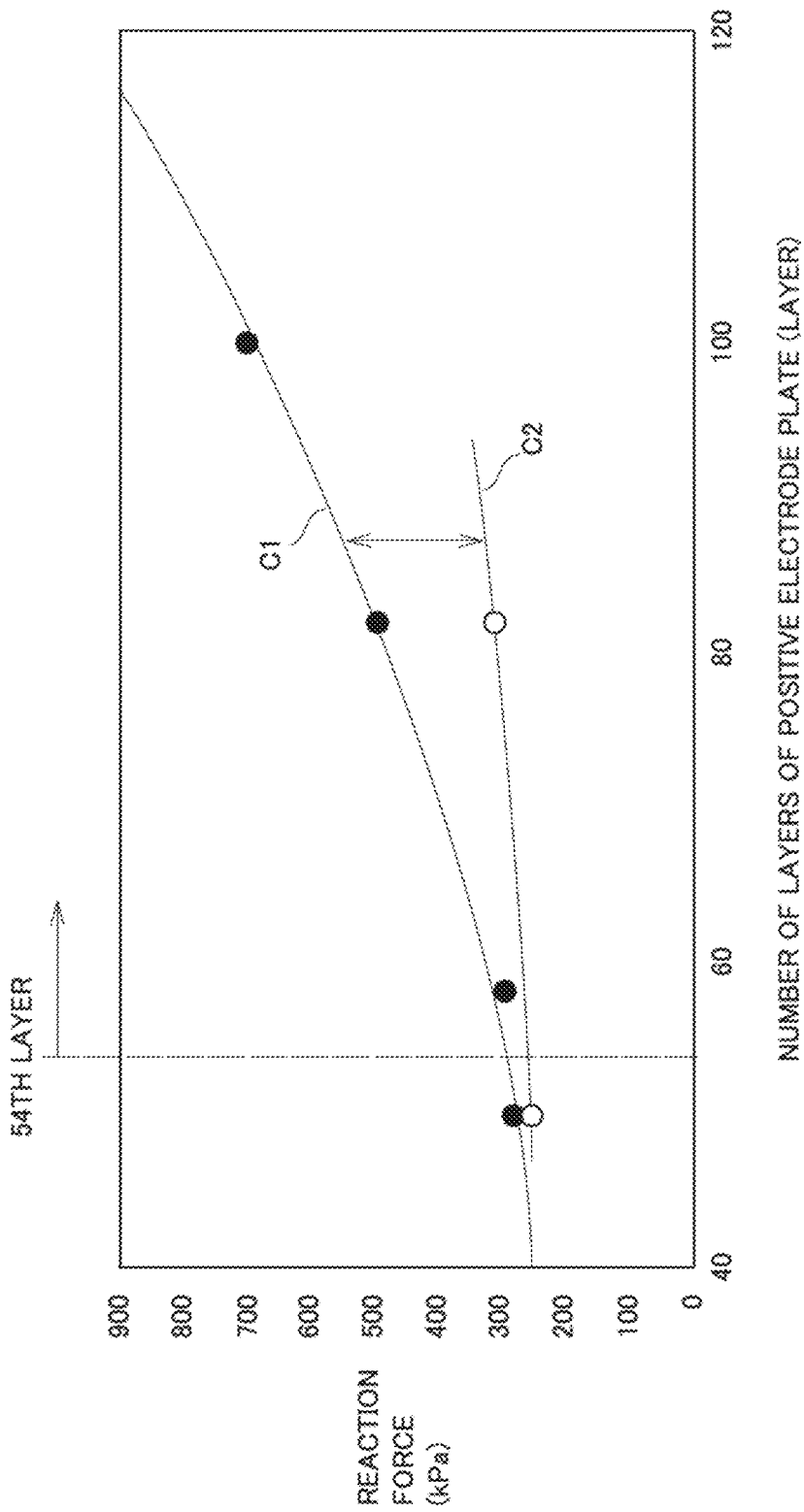
FIG. 9 is a graph showing a relation between the number of layers of the positive electrode plate and the reaction force.

FIG. 9 is a graph showing a relation between the number of the layers of the positive electrode plate and the reaction force.

FIG. 9 shows results of No. 1, No. 4, and No. 6 to No. 9. It is observed that the reaction force tends to be increased as the number of the layers of the positive electrode plate is increased. It is also observed that the reaction force tends to be reduced as the proportional limit is smaller.

A first curve (C1) reflects a result when the proportional limit is 9.7 MPa. A second curve (C2) reflects a result when the proportional limit is 6.2 MPa. A difference (C1-C2) between the first curve (C1) and the second curve (C2) becomes larger as the number of the layers is increased. That is, it is considered that the increased number of the layers leads to an increased range of reduction of the reaction force by the adjustment of the proportional limit.

In a range in which the number of the layers is more than or equal to 54, the difference (C1-C2) is large. Therefore, in the range in which the number of the layers is more than or equal to 54, it is expected that the range of reduction of the reaction force is large. However, when the number of the layers is more than 110, poor welding may be resulted when welding the electrode assembly and the positive electrode current collecting member, for example.

The present embodiment and the present example are illustrative in any respects. The present embodiment and the present example are not restrictive. For example, it is initially expected to extract freely configurations from the present embodiment and the present example and combine them freely.

The technical scope defined by the terms of the claims encompasses any modification within the meaning equivalent to the terms of the claims. The technical scope defined by the terms of the claims also encompasses any modification within the scope equivalent to the terms of the claims.

What is claimed is:

1. A nonaqueous electrolyte secondary battery, comprising:
   an exterior package;
   an electrode assembly; and
   an electrolyte solution,
   wherein
   the exterior package stores the electrode assembly and the electrolyte solution,
   the electrode assembly is shaped to have a flat shape,
   the electrode assembly includes a layered body,
   the layered body includes a first separator, a positive electrode plate, a second separator, and a negative electrode plate,
   the first separator, the positive electrode plate, the second separator, and the negative electrode plate are layered in this order,
   the electrode assembly is formed by spirally winding the layered body,
   each of the first separator and the second separator has a proportional limit of 4.5 MPa to 10.2 MPa,
   the proportional limit is measured in a compression test in a thickness direction of each of the first separator and the second separator,
   each of the first separator and the second separator has an air permeability of 200 s/100 ml to 300 s/100 ml,
   in the layered body of the electrode assembly, a relation of the following formula (1) is satisfied:

$$x+y+z \leq 210 \tag{1}$$

where
   x represents a thickness (μm) of the positive electrode plate,
   y represents a thickness (μm) of the negative electrode plate, and
   z represents a total of a thickness (μm) of the first separator and a thickness (μm) of the second separator,
   each of the first separator and the second separator has a thickness of 14 μm to 19 μm,
   in a cross section that perpendicularly intersects a winding axis of the electrode assembly,
      the electrode assembly includes a curved portion and a flat portion,
      the positive electrode plate has a curved surface at the curved portion,
      the positive electrode plate has a flat surface at the flat portion, and
      54 or more and 110 or less layers of the positive electrode plate are layered at the flat portion,
   each of the first separator and the second separator has a crease which decreases gradually in a direction from a center of the electrode assembly toward an outer layer side of the layered body of the electrode assembly and finally disappears, and each of the first separator and the second separator has a multilayer structure which consists of, in sequence, a polypropylene layer, a polyethylene layer, and a polypropylene layer.

2. A battery pack, comprising:
one or more cells; and
a housing,
wherein
each of the one or more cells is a nonaqueous electrolyte secondary battery, the nonaqueous electrolyte secondary battery including:
an exterior package;
an electrode assembly; and
an electrolyte solution,
wherein
the exterior package stores the electrode assembly and the electrolyte solution,
the electrode assembly is shaped to have a flat shape,
the electrode assembly includes a layered body,
the layered body includes a first separator, a positive electrode plate, a second separator, and a negative electrode plate,
the first separator, the positive electrode plate, the second separator, and the negative electrode plate are layered in this order,
the electrode assembly is formed by spirally winding the layered body,
each of the first separator and the second separator has a proportional limit of 4.5 MPa to 10.2 MPa,
the proportional limit is measured in a compression test in a thickness direction of each of the first separator and the second separator,
each of the first separator and the second separator has an air permeability of 200 s/100 ml to 300 s/100 ml,
in the layered body of the electrode assembly, a relation of the following formula (1) is satisfied:

$$x+y+z \leq 210 \quad (1),$$

where
x represents a thickness (μm) of the positive electrode plate,
y represents a thickness (μm) of the negative electrode plate, and
z represents a total of a thickness (μm) of the first separator and a thickness (μm) of the second separator,
each of the first separator and the second separator has a thickness of 14 μm to 19 μm,
in a cross section that perpendicularly intersects a winding axis of the electrode assembly,
the electrode assembly includes a curved portion and a flat portion,
the positive electrode plate has a curved surface at the curved portion,
the positive electrode plate has a flat surface at the flat portion, and
54 or more and 110 or less layers of the positive electrode plate are layered at the flat portion,
each of the first separator and the second separator has a crease which decreases gradually in a direction from a center of the electrode assembly toward an outer layer side of the layered body of the electrode assembly and finally disappears,
each of the first separator and the second separator has a multilayer structure which consists of, in sequence, a polypropylene layer, a polyethylene layer, and a polypropylene layer,
the housing includes a restraint component,
the restraint component restrains each of the one or more cells, and
the restraint component is composed of a resin material.

* * * * *